United States Patent
Shan et al.

(10) Patent No.: US 9,600,382 B2
(45) Date of Patent: Mar. 21, 2017

(54) ERROR RECOVERY CIRCUIT ORIENTED TO CPU PIPELINE

(71) Applicant: SOUTHEAST UNIVERSITY, Jiangsu (CN)

(72) Inventors: Weiwei Shan, Jiangsu (CN); Chaoxuan Tian, Jiangsu (CN); Huafang Sun, Jiangsu (CN); Longxing Shi, Jiangsu (CN)

(73) Assignee: SOUTHEAST UNIVERSITY (CN)

( * ) Notice: Subject to any disclaimer, the term of this patent is extended or adjusted under 35 U.S.C. 154(b) by 115 days.

(21) Appl. No.: 14/442,071

(22) PCT Filed: Aug. 30, 2013

(86) PCT No.: PCT/CN2013/082643
§ 371 (c)(1),
(2) Date: May 11, 2015

(87) PCT Pub. No.: WO2014/032610
PCT Pub. Date: Mar. 6, 2014

(65) Prior Publication Data
US 2015/0309897 A1    Oct. 29, 2015

(30) Foreign Application Priority Data

Sep. 3, 2012 (CN) .......................... 2012 1 0319577
Dec. 26, 2012 (CN) .......................... 2012 1 0574735

(51) Int. Cl.
*G06F 11/00* (2006.01)
*G06F 11/20* (2006.01)
(Continued)

(52) U.S. Cl.
CPC .......... *G06F 11/2035* (2013.01); *G06F 1/324* (2013.01); *G06F 1/3296* (2013.01);
(Continued)

(58) Field of Classification Search
USPC ......................................................... 714/10
See application file for complete search history.

(56) References Cited

U.S. PATENT DOCUMENTS

9 A * 8/1836 Blanchard ................. B25C 1/02
165/145
4,982,402 A * 1/1991 Beaven ................. G06F 9/3863
712/E9.061
(Continued)

FOREIGN PATENT DOCUMENTS

CN    1397878    2/2003
CN    102411395    4/2012
CN    103019876    4/2013

OTHER PUBLICATIONS

International Search Report issued in application No. PCT/CN2013/082643, dated Nov. 13, 2013 (4 pgs).

*Primary Examiner* — Amine Riad
(74) *Attorney, Agent, or Firm* — Hayes Soloway P.C.

(57) ABSTRACT

Disclosed is an error recovery circuit facing a CPU assembly line, comprising: on-chip monitoring circuits (1), an error signal statistics module (2), a voltage frequency control module (3), an error recovery control module (4), an in-situ error recovery module (5) and an upper-layer error recovery module (6), wherein each of the on-chip monitoring circuits (1) is integrated at the end of each stage of assembly lines of the previous N−1 stages of assembly lines of a CPU kernel with an N-stage assembly line structure, so as to monitor the time sequence information about each clock period of an operating circuit, wherein N is a positive integer which is greater than or equal to 3 and less than 20. The present invention provides the on-line time sequence monitoring on the CPU kernel with N stages of assembly lines to search for the lowest possible operating voltage of the circuit, and to reduce the margin of the operating voltage (Continued)

reserved for the circuit in the design stage, thereby significantly reducing the power consumption of the circuit and improving the energy efficiency of the circuit.

6 Claims, 4 Drawing Sheets

(51) Int. Cl.
*G06F 11/30* (2006.01)
*G06F 1/32* (2006.01)

(52) U.S. Cl.
CPC ...... *G06F 11/3024* (2013.01); *G06F 11/3093* (2013.01); *G06F 2201/805* (2013.01); *G06F 2201/85* (2013.01); *Y02B 60/1217* (2013.01); *Y02B 60/1285* (2013.01)

(56) References Cited

U.S. PATENT DOCUMENTS

| | | | | |
|---|---|---|---|---|
| 5,491,794 A * | 2/1996 | Wu | ........................... | H04N 5/63 348/177 |
| 6,625,756 B1 * | 9/2003 | Grochowski | ............. | G06F 9/28 712/E9.008 |
| 6,823,473 B2 * | 11/2004 | Mukherjee | .......... | G06F 11/1497 712/227 |
| 6,854,075 B2 * | 2/2005 | Mukherjee | .............. | G06F 9/383 712/227 |
| 7,162,661 B2 * | 1/2007 | Mudge | .................. | G06F 1/3203 714/10 |
| 7,243,262 B2 * | 7/2007 | Mukherjee | ............ | G06F 9/3851 712/E9.053 |
| 7,337,356 B2 * | 2/2008 | Mudge | .................. | G06F 9/3861 714/10 |
| 7,392,413 B2 * | 6/2008 | Shikata | ................. | G06F 1/3203 324/537 |
| 7,512,825 B2 * | 3/2009 | Winick | .................... | G06F 1/305 713/340 |
| 7,516,358 B2 * | 4/2009 | Haefliger | ................. | G06F 11/24 700/186 |
| 7,671,627 B1 * | 3/2010 | Somani | ................. | G06F 9/3861 326/46 |
| 7,895,469 B2 * | 2/2011 | Ozer | ..................... | G06F 9/3842 714/10 |
| 8,245,070 B2 * | 8/2012 | Finkelstein | ........... | G06F 1/3203 713/322 |
| 8,296,602 B2 * | 10/2012 | Fukuda | ................. | G06F 9/4881 709/213 |
| 8,621,272 B2 * | 12/2013 | Das | .................. | G01R 31/31816 714/10 |
| 8,803,580 B2 * | 8/2014 | Shi | ....................... | H03K 17/223 327/143 |
| 8,892,931 B2 * | 11/2014 | Kruglick | ...................... | 711/211 |
| 8,909,999 B2 * | 12/2014 | Shi | ........................... | G06F 1/26 714/45 |
| 2002/0152417 A1 * | 10/2002 | Nguyen | .................... | G06F 1/30 714/10 |
| 2002/0194463 A1 | 12/2002 | Henry et al. | ................... | 712/239 |
| 2009/0315601 A1 | 12/2009 | Priel et al. | ................... | 327/161 |
| 2010/0185878 A1 * | 7/2010 | Rozen | ....................... | G06F 1/30 713/300 |
| 2010/0281298 A1 * | 11/2010 | Pont | ...................... | G06F 1/3203 714/10 |
| 2010/0325457 A1 * | 12/2010 | Lachwani | ............. | G06F 1/3203 713/323 |
| 2012/0005515 A1 * | 1/2012 | Reddi | ....................... | G06F 1/28 713/340 |
| 2013/0154583 A1 | 6/2013 | Shi et al. | ....................... | 323/234 |
| 2014/0281696 A1 * | 9/2014 | Bacha | ....................... | G06F 1/26 714/10 |
| 2015/0058667 A1 * | 2/2015 | Jahagirdar | ............ | G06F 1/3203 714/10 |

* cited by examiner

ERROR RECOVERY CIRCUIT ORIENTED TO CPU PIPELINE

I. TECHNICAL FIELD

The present invention relates to an error recovery circuit oriented to CPU pipelines, in particular to an error recovery circuit which is based on on-chip error monitoring, oriented to CPU pipelining applications, and switchable according to the monitoring result, and belongs to the integrated circuit design field.

II. BACKGROUND ART

As transistors become smaller and smaller, the number of transistors integrated on unit area has increased rapidly, and the power consumption of integrated circuit has become a factor that is of the same significance as functionality and area. A dynamic voltage and frequency scaling (DVFS) technique, which aims at reducing the power consumption of circuit, has become an important power saving technique gradually owing to its remarkable effect.

DVFS depends on the monitoring of the operating state and performance of the main circuit. A main system-level monitoring means is to utilize sensors. Though such a means, it can reflect the current operating condition of the system to some degree, but off-chip monitoring often depends on the accuracy of the sensors and it is difficult to choose reliable monitoring points. Therefore, it is difficult to reflect the actual condition of each part in a chip by off-chip monitoring. Though a method that involves inserting critical units and replicating critical paths in a chip, it can reflect the variations of global parameters in the chip authentically, but the replicates and critical units and paths are not in the same on-chip environment, it is not sensitive to the variations of local parameters such as local noise and process fluctuations, consequently, it is difficult to reflect the actual condition of the circuits, and the voltage scaling effect is severely compromised.

An on-chip monitoring method monitors the operating condition of the circuit in real time by inserting on-chip monitoring circuits into the terminals of critical paths in the main circuit of the system, and boils down the impacts of process deviation, supply voltage fluctuation, temperature variation, and noise, etc. into variations of time-delay characteristics of the on-chip monitoring circuits in the critical paths. In case the voltages drops to be lower than a threshold voltage below which the circuit is error-prone, timing violations may occur in the on-chip logic. These timing violations are monitored by on-chip monitoring circuits, and then corresponding error signals are generated as a basis for voltage controlling of an operating voltage control module. An on-chip monitoring method can monitor the error level of the main circuit in real time during operation, and reflect the actual impact of global and local disturbances on the circuit; by introducing an error correction mechanism into the method, the voltage margin, which is reserved in the main circuit design stage for overcoming the adverse impacts of process deviation, supply voltage fluctuation, temperature variation, and ambient noise, etc., can be further released, so that the operating voltage can be regulated dynamically and thereby the power consumption can be optimized.

A DVFS technique based on on-chip monitoring boils down the operating conditions of a circuit (e.g., temperature, process, and noise variations) to timing variations of the circuit, and monitors the timing variations of the circuit in real time by on-chip monitoring, so as to instruct the circuit to regulate the operating parameters dynamically. The voltage or frequency margin reserved in the circuit design against the worst case can be reduced as much as possible so as to obtain a maximum power consumption reduction benefit only after the lowest operating voltage that meets the system performance requirement is found.

There is a risk of system errors when the lowest voltage point at any time of system operation is sought dynamically. Hence, an appropriate error recovery mechanism must be set to help the system recover from its error state in case of any system error. There are mainly two error recovery approaches used in China and foreign countries: local error recovery and global error recovery.

Local error recovery is to suspend the clock signal of the circuit for a cycle by means of clock gating and replace the error signal output with a correct signal in that period in case a timing error is detected by an on-chip monitoring unit in the circuit. For all errors occurring in different stages of the pipeline in a same cycle, the system can be recovered in one suspended clock cycle; however, for errors occurring in different cycles, the clock signal must be suspended immediately for error recovery when such an error occurs. The on-chip monitoring unit that employs such an error recovery approach is complex in structure, and the power consumption of the monitoring unit itself is high; in addition, if circuit errors occur frequently owing to the operating conditions such as operating voltage, frequency, and temperature, etc., for each clock cycle that involves errors, the CPU clock has to be suspended for a cycle to wait for error signal recovery. Consequently, the cost of error recovery is high, the system throughput is severely compromised, and the power saving effect is not satisfactory.

A global error recovery approach is usually used in the design of pipeline architecture, and it also utilizes an on-chip monitoring unit. Different from an local error recovery approach, in this recovery approach, all errors occurring in the same cycle boils down to one error, and when the on-chip monitoring unit detects an timing error, the error correction is not carried out immediately, instead, it waits till all stages of operations that do not involve errors in the pipelines are executed, i.e., waits till the stages of operations that involve errors are executed to the final stage along the pipelines, and then recovers the errors by executing the instructions that involve errors again. While an instruction that involves errors is executed again, the instructions following that instruction are being executed again. Hence, in the global error recovery approach, the recovery from all errors in a pipeline cycle (consisting of multiple clock cycles required to fully fill the pipeline, i.e., N clock cycles, where, N is the number of pipeline stages) can be completed in one recovery operation. Such a recovery approach consumes N cycles in one run. In a case that the system error ratio is high and multiple errors occur in the same pipeline cycle, all these errors can be recovered in one global error recovery operation. Therefore, if the system error ratio is high, the global error recovery approach has smaller impact on the system throughput and has a better power consumption reduction effect; however, if the system error ratio is low, the cost of recovery is high and the power consumption reduction effect is not significant.

At present, the recovery of DVFS circuit solely utilizes one of the approaches described above, and its system applicability is very limited. For applications that require a wide frequency range and involve high error ratio variations, it is difficult to attain optimal system throughput and power consumption in single error recovery approach.

III. CONTENTS OF THE INVENTION

Object

In view of the limitations in error recovery approach in on-chip monitoring systems in the prior art, the object of the present invention is to provide an error recovery circuit oriented to CPU pipelines, which can dynamically select an appropriate error recovery mode for the system and switch between local error recovery mode and global error recovery mode flexibly according to the system requirement and operating state of the circuit in case an on-chip monitoring circuit detects a timing error of the circuit.

Technical Solution

The error recovery circuit oriented to CPU pipelines disclosed in the present invention comprises on-chip monitoring circuits, an error signal statistics module, a voltage and frequency control module, an error recovery control module, a local error recovery module, and a global error recovery module.

The on-chip monitoring circuit is integrated at the terminal of each of the first N−1 pipeline stages of a CPU core in N-stage pipeline architecture, and monitors the timing information of each clock cycle in the operating circuit, where, N is a positive integer greater than or equal to 3 but smaller than 20; the on-chip monitoring circuit feeds any error signals detected by it into the error signal statistics module.

The error signal statistics module performs statistics on the percentage of the number of error signals in a specific number of clock cycles to the total number of clock cycles, i.e., an error ratio $R_{error}$.

The voltage and frequency control module controls the increase and decrease of the operating voltage and frequency of the system as well as the control accuracy. The voltage and frequency control module and error signal statistics module feed system state and error ratio $R_{error}$ into the error recovery control module respectively; the voltage and frequency control module regulates the operating voltage and frequency of the system according to the corresponding control signals from the error recovery control module.

The error recovery control module has a preset comparative threshold $T_{threshold}$ in it, and determines whether to input a local error recovery mode selection signal into the local error recovery module or to input a global error recovery mode selection signal into the global error recovery module, so as to select local error recovery mode or global error recovery mode dynamically according to the result generated in a threshold comparison and selection mechanism, and sends a voltage and frequency control signal to the voltage and frequency control module to instruct system state regulating, so as to realize dynamic switchover between two different error recovery modes.

The on-chip monitoring circuit comprises a master latch circuit, a slave latch circuit, a shadow latch circuit, an error signal generation circuit, a local error correction selector, a semi-stable state monitoring circuit, and an error signal integration circuit; by sampling the input signal at the rising edge and falling edge of clock signal and comparing the sampling results, the on-chip monitoring circuit judges whether any timing violation is occurred in the circuit, and implements data replacement function for local error recovery at the same time. Wherein, input terminals of the master latch circuit and the shadow latch circuit are connected to a data input terminal of the on-chip monitoring circuit; the signal of data for local recovery in the master latch circuit and the local recovery data signal in the shadow latch circuit are connected to one input terminal of the local error correction selector, and an input terminal of local error recovery control signal is connected to the other input terminal of the local error correction selector; the local recovery data signal output of the local error correction selector is connected to the slave latch circuit; the signal output of the slave latch circuit is connected to a data output terminal, an input terminal of the semi-stable state monitoring circuit, and one input terminal of the error signal generation circuit respectively; the delayed sampled data signal output of the shadow latch circuit is connected to the other input terminal of the error signal generation circuit; a time sequence monitoring error signal generated by the error signal generation circuit is inputted to one input terminal of the error signal integration circuit; a semi-stable state monitoring error signal generated by the semi-stable state monitoring circuit is inputted to the other input terminal of the error signal integration circuit; the output of the error signal integration circuit is the error signal output terminal of the on-chip monitoring circuit.

The on-chip monitoring circuit comprises two input ports and two output ports, which are data input terminal, local error recovery control signal input terminal, data output terminal, and error signal output terminal respectively. The data input terminal is connected to a data signal output terminal of the previous stage in the pipeline where the on-chip monitoring circuit is inserted; the local error recovery control signal input terminal is connected to a local error recovery control signal output terminal of the local error recovery module; the data output terminal is connected to a data signal input terminal of the post stage in the pipeline where the on-chip monitoring circuit is inserted; the error signal output terminal is connected to an input terminal of an error signal transmission integration circuit. The error signal transmission integration circuit consists of N−1 registers and N−2 two-input OR gates connected alternatively, and is configured to transmit the error signals generated in all pipeline stages to follow-up stages and finally integrate the error signals into one error signal; one input terminal of the two-input OR gate is connected to the output terminal of a register, and the other input terminal of the two-input OR gate is connected to the error signal output terminal of the on-chip monitoring circuit.

The error signal statistics module comprises two counters, which are configured to count the number of operating cycles of the CPU and the number of error signals respectively.

The error recovery control module has three input terminals and three output terminals, which are error ratio input terminal, system state input terminal, comparative threshold input terminal, and voltage and frequency control signal output terminal, local error recovery mode selection signal output terminal, and global error recovery mode selection signal output terminal respectively; wherein, the error ratio input terminal, system state input terminal, and comparative threshold input terminal are connected to the input terminals of an 8-bit register respectively, specifically, the error ratio input terminal is connected to register 1, the system state input terminal is connected to register 2, and the comparative threshold input terminal is connected to register 3; the output terminal of register 1 and the output terminal of register 2 are connected to the data input terminals of an 8-bit adder respectively, and the carry-save input terminal of the adder is set to 0; the sum output terminal of the adder is connected to one data input terminal of a comparator, and the output terminal of register 3 is connected to another data input terminal of the comparator; the rest three input terminals of the comparator are set to 0; the "greater than" output terminal and "equal to" output terminal of the comparator are connected to an OR gate, and the output of the OR gate is connected to a selection terminal of a multiplexer MUX1; the "smaller than" output terminal of the comparator is connected to another multiplexer MUX2; the terminals "1" of the multiplexer MUX1 and multiplexer MUX2 are connected to high level, while the terminals "0" are connected to low level; the output signal of the multiplexer MUX1 is a local error recovery mode selection signal, while the output signal of the multiplexer MUX2 is a global error recovery mode selection signal; in addition, the error ratio input terminal, system state input terminal, local error recovery mode selection signal, and global error recovery mode selection signal are connected to a state machine, and the output of the state machine is a voltage and frequency control signal.

The corresponding voltage and frequency control signal generated by the error recovery control module during error recovery is inputted to the voltage and frequency control module, and the voltage and frequency control signal contains a clock control signal and a voltage control signal, wherein, the clock control signal is used to assist re-execution of instructions or local replacement of data by regulating the clock frequency and phase, the voltage control signal is used to assist re-execution of instructions or local replacement of data by regulating the operating voltage of the system, and the clock control signal and voltage control signal are used in combination, so as to increase the frequency or decrease the voltage when there is no time sequence error in the system; or decrease the frequency and increase the voltage when an error signal occurs in the system, and thereby attain a purpose of recovering the system from time sequence errors while keeping the system operating normally with low power consumption.

The threshold comparison and selection mechanism is to compare a comparative parameter $T_{ref}$ with a comparative threshold $T_{threshold}$, wherein, the comparative parameter $T_{ref}$ is obtained from a formula $T_{ref}=R_{error}+V_{temp}/V_{max}+F_{temp}/F_{max}$. The comparative threshold is a threshold value for selection, and the comparative parameter $T_{ref}$ is an arithmetic sum of three values (note: fitting three significant impact factors into an integrated impact result), which are error ratio, operating voltage ratio, and operating frequency ratio, respectively. Wherein, the error ratio is the error ratio of the system within a specific number of clock cycles as calculated by the error signal statistics module, the operating voltage ratio is the ratio of current operating voltage of the circuit to maximum operating voltage of the circuit, and the operating frequency ratio is the ratio of current operating frequency of the circuit to maximum operating frequency of the circuit.

The threshold comparison and selection mechanism is established through the following procedures:

First, find out the comparative threshold. In the circuit design stage, according to the power control mode of a power management module for the circuit, calculate the arithmetic sum of the error ratio, operating voltage ratio and operating frequency ratio calculated at each operating point of the circuit under the condition of a specific regulation step size, and the result is the comparative parameter, and carry out error recovery in global error recovery mode and local error recovery mode respectively, to obtain the power consumption reduction benefits provided by the two error recovery modes. Find out an operating point starting from which the power consumption reduction benefit in global error recovery mode is greater than that in local error recovery mode, and the comparative parameter at that operating point is taken as the comparative threshold. Setting the comparative threshold, namely, set the comparative threshold found out as above into the error recovery control module in a programmable manner as a standard of comparison for error recovery mode selection.

Then, select an error recovery mode. Set the comparative threshold $T_{threshold}$ into the error recovery control module in a programmable manner, and then the error recovery control module can compare the comparative parameter with the preset comparative threshold; if the comparative parameter is greater than or equal to the comparative threshold, the global error recovery mode will be selected; if the comparative parameter is smaller than the comparative threshold, the local error recovery mode will be selected. When the comparative parameter $T_{ref}$ exceeds the comparative threshold $T_{threshold}$, the power consumption reduction benefit in global error recovery mode is higher. When the comparative parameter $T_{ref}$ is smaller than the comparative threshold $T_{threshold}$, the power consumption reduction benefit in local error recovery mode is higher. In addition, the error recovery control module will generate an corresponding voltage and frequency control signal according to the error recovery mode, and the voltage and frequency control module will regulate the operating voltage and frequency of the system to appropriate values, to attain an optimal power consumption reduction effect.

Compared with the prior art, the present invention has the following beneficial effects:

1. The present invention provides an online time sequence monitoring method for a CPU core having an N-stage pipeline, which reduce the operating voltage margin reserved for the circuit in the design stage by finding out the lowest permissible operating voltage of the circuit, and thereby greatly reduce the power consumption and improve the energy efficiency of the circuit.

2. The present invention provides a method that involves two different error recovery modes: local error recovery mode and global error recovery mode; thus, an appropriate error recovery mode can be selected flexibly for the system according to the system requirement and operating state of the circuit, and the error recovery can be switched dynamically between the two recovery modes. When the circuit operates in a wide operating frequency range, the method provided in the present invention is applicable to more application scenarios than a method that simply utilizes a local error recovery mode or global error recovery mode, and achieves higher throughput and higher power consumption reduction benefit. In addition, the present invention overcomes the limitation of low applicability of the global error recovery approach, and solves the problems of limited system applicability, low throughput, and unsatisfactory power consumption reduction benefit, which are related to application of a single error recovery mode in a wide operating frequency range.

3. A threshold comparison and selection mechanism is set in the present invention to selectively switch between two recovery modes. The comparative threshold is a threshold value for selection, and it is the final switchover threshold converted with comprehensive consideration of the impacts of three significant impact factors, i.e., error ratio, operating voltage ratio, and operating frequency ratio. Thus, the operating state of the circuit can be considered comprehensively, and thereby the specific error recovery mode required to attain an optimal low power consumption effect can be judged for the circuit in a better way.

IV. DESCRIPTION OF DRAWINGS

V. EMBODIMENTS

Hereunder the technical solution of the present invention will be detailed, but it should be appreciated that the scope of protection of the present invention is not limited to the described embodiments.

Embodiment 1

Figure 1:
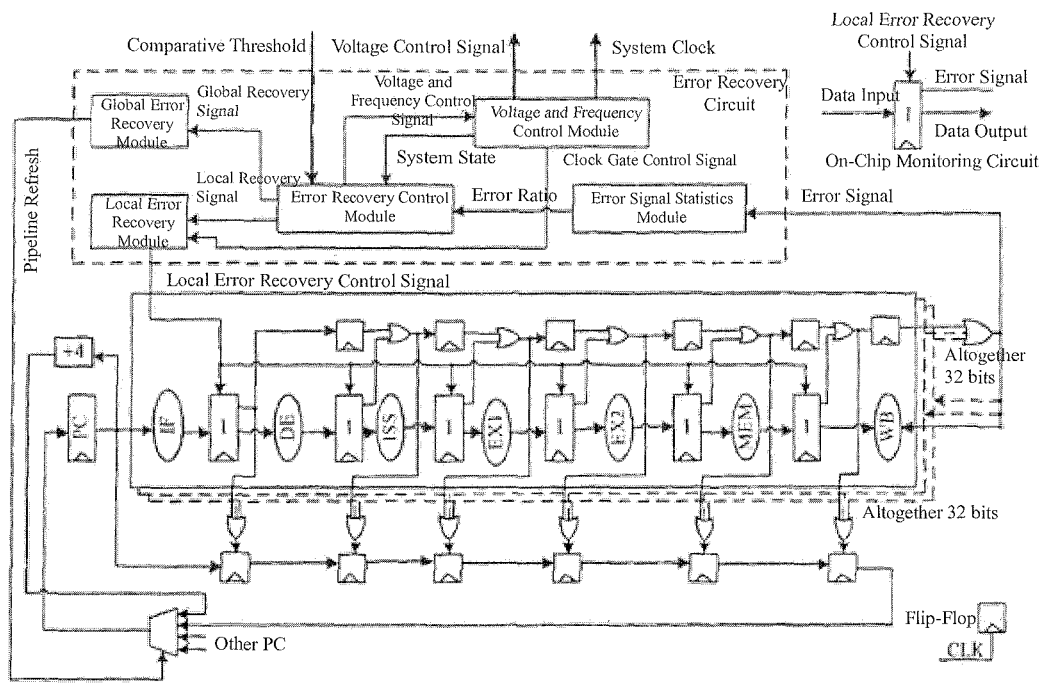
FIG. 1 is a structural block diagram of the present invention.

As shown in FIG. 1, the error recovery circuit oriented to CPU pipelines according to the present invention comprises on-chip monitoring circuits 1, an error signal statistics module 2, a voltage and frequency control module 3, an error recovery control module 4, a local error recovery module 5, and a global error recovery module 6, wherein, the on-chip monitoring circuit 1 is integrated at the terminal of each of the first N−1 pipeline stages of a CPU core in N-stage pipeline architecture (where, N is a positive integer greater than 3 but smaller than 20), and it monitors the time sequence information of each clock cycle of the operating circuit and generate error signals; whereas, for the pipeline in the stage N, where no on-chip monitoring unit is arranged, the time sequence should be designed to be loose enough to avoid errors.

Figure 2:
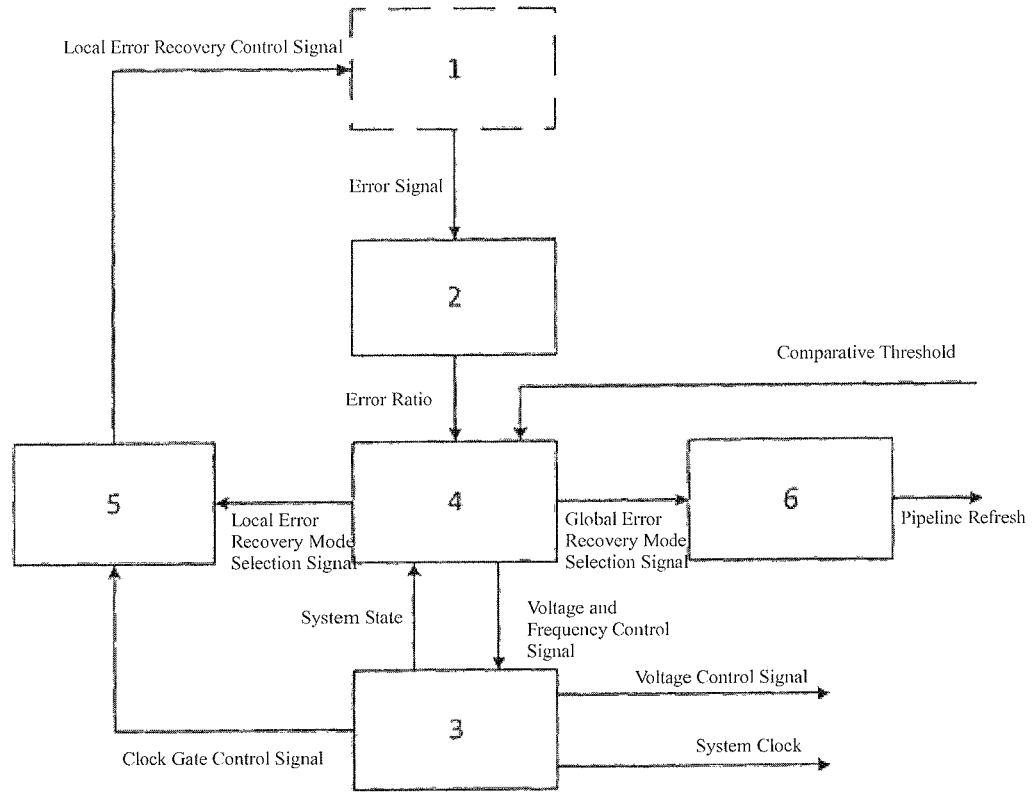
FIG. 2 is a structural block diagram of the error recovery circuit in the present invention.

The composition of the error recovery circuit is shown in FIG. 2. The on-chip monitoring circuit 1 sends error signals detected by it to the error signal statistics module 2, and the error signal statistics module 2 performs statistics of the error ratio detected in a specific number of clock cycles, and it comprises two counters, which count the number of CPU operating cycles and the number of error signals respectively; the error ratio calculated by the error signal statistics module 2 and the system state (operating voltage and operating frequency) of the voltage and frequency control module 3 are sent to the error recovery control module 4, and the voltage and frequency control module 3 regulates the operating voltage and frequency of the system and controls the control accuracy at the same time according to the corresponding control signal from the error recovery control module 4. The error recovery control module 4 has a preset comparative threshold $T_{threshold}$ in it, and it selects whether to send a local error recovery mode selection signal to the local error recovery module 5 or to send a global error recovery mode selection signal to the global error recovery module 6 according to the result obtained in the threshold comparison and selection mechanism. At the same time, the error recovery control module 4 sends a system voltage and frequency control signal to the voltage and frequency control module 3, so as to dynamically regulate the operating state of the system.

Figure 4:
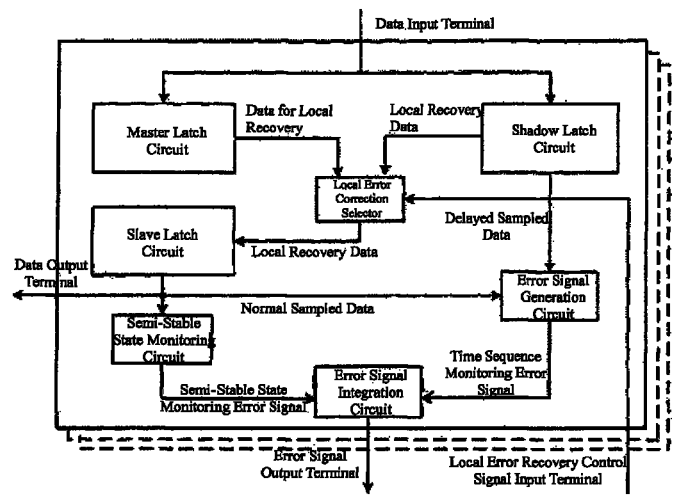
FIG. 4 is a structural block diagram of the on-chip monitoring circuit in the present invention.

The structure of the on-chip monitoring circuit 1 is shown in FIG. 4. The on-chip monitoring circuit 1 comprises a master latch circuit, a slave latch circuit, a shadow latch circuit, an error signal generation circuit, a local error correction selector, a semi-stable state monitoring circuit, and an error signal integration circuit; by sampling the input signal at the rising edge and falling edge of clock signal and comparing the sampling results, the on-chip monitoring circuit judges whether any timing violation is occurred in the circuit, and implements a data replacement function for local error recovery at the same time. The on-chip monitoring circuit 1 comprises two input ports and two output ports, which are data input terminal, local error recovery control signal input terminal, data output terminal, and error signal output terminal respectively. Wherein, an input terminal of the master latch circuit and an input terminal of the shadow latch circuit are connected to a data input terminal of the on-chip monitoring circuit; the signal of data for local recovery in the master latch circuit and the local recovery data signal in the shadow latch circuit are connected to one input terminal of the local error correction selector, and an input terminal of local error recovery control signal is connected to the other input terminal of the local error correction selector; the local recovery data signal output of the local error correction selector is connected to the slave latch circuit; the signal output of the slave latch circuit is connected to a data output terminal, an input terminal of the semi-stable state monitoring circuit, and one input terminal of the error signal generation circuit respectively; the delayed sampled data signal output of the shadow latch circuit is connected to the other input terminal of the error signal generation circuit; a time sequence monitoring error signal generated by the error signal generation circuit is inputted to one input terminal of the error signal integration circuit; a semi-stable state monitoring error signal generated by the semi-stable state monitoring circuit is inputted to the other input terminal of the error signal integration circuit; the output of the error signal integration circuit is the error signal output terminal of the on-chip monitoring circuit.

The connection of the on-chip monitoring circuit in the pipeline is shown in FIG. 1. The data input terminal is connected to a data signal output terminal of the previous stage in the pipeline where the on-chip monitoring circuit is inserted; the local error recovery control signal input terminal is connected to a local error recovery control signal output terminal of the local error recovery module; the data output terminal is connected to a data signal input terminal of the post stage in the pipeline where the on-chip monitoring circuit is inserted; the error signal output terminal is connected to an input terminal of an error signal transmission integration circuit. The error signal transmission integration circuit consists of N−1 registers and N−2 two-input OR gates connected alternatively, and is configured to transmit the error signals generated in all pipeline stages to follow-up stages and finally integrate the error signals into one error signal; one input terminal of the two-input OR gate is connected to the output terminal of a register, and the other input terminal of the two-input OR gate is connected to the error signal output terminal of the on-chip monitoring circuit.

Figure 3:
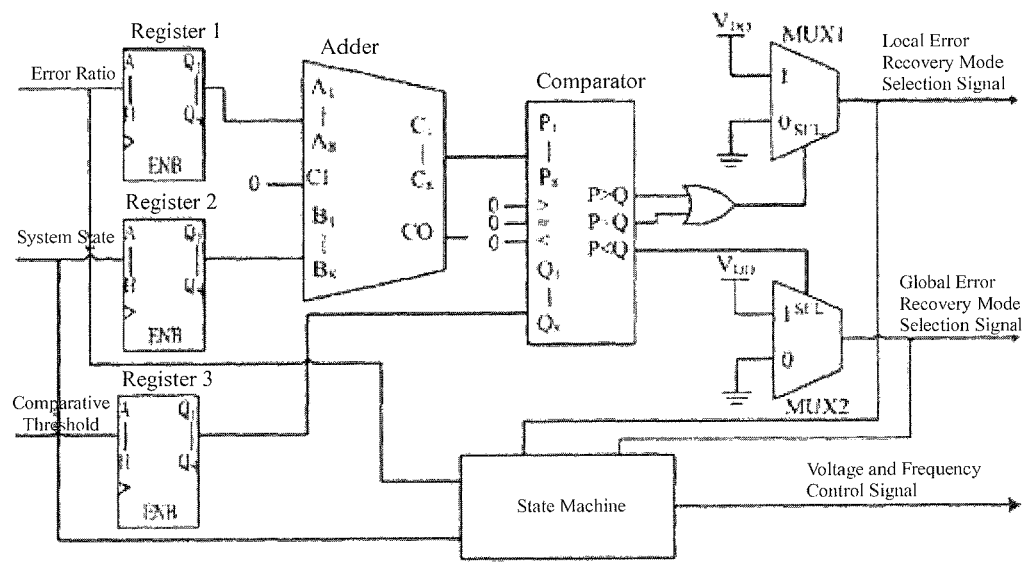
FIG. 3 is a circuit diagram of the error recovery control module in the present invention.

The structure of the error recovery control module is shown in FIG. 3. The error recovery control module has three input terminals and three output terminals, which are error ratio input terminal, system state input terminal, comparative threshold input terminal, and voltage and frequency control signal output terminal, local error recovery mode selection signal output terminal, and global error recovery mode selection signal output terminal respectively; wherein, the error ratio input terminal, system state input terminal, and comparative threshold input terminal are connected to the input terminals of an 8-bit register respectively, specifically, the error ratio input terminal is connected to register 1, the system state input terminal is connected to register 2, and the comparative threshold input terminal is connected to register 3; the output terminal of register 1 and the output terminal of register 2 are connected to the data input terminals of an 8-bit adder respectively, and the carry-save input terminal of the adder is set to 0; the sum output terminal of the adder is connected to one data input terminal of a comparator, and the output terminal of register 3 is connected to another data input terminal of the comparator; the rest three input terminals of the comparator are set to 0; the "greater than" output terminal and "equal to" output terminal of the comparator are connected to an OR gate, and the output of the OR gate is connected to a selection terminal of a multiplexer MUX1; the "smaller than" output terminal of the comparator is connected to another multiplexer MUX2; the terminals "1" of the multiplexer MUX1 and multiplexer MUX2 are connected to high level, while the terminals "0" are connected to low level; the output signal of the multiplexer MUX1 is a local error recovery mode selection signal, while the output signal of the multiplexer MUX2 is a global error recovery mode selection signal; in addition, the error ratio input terminal, system state input terminal, local error recovery mode selection signal, and global error recovery mode selection signal are connected to a state machine, and the output of the state machine is a voltage and frequency control signal.

The error recovery control module 4 contains a threshold comparison and selection mechanism and generates a voltage and frequency control signal to instruct the voltage and frequency control module 3 to dynamically regulate the operating state of the system; the corresponding voltage and frequency control signal generated by the error recovery control module 4 during error recovery is inputted to the voltage and frequency control module, and the voltage and frequency control signal contains a clock control signal and a voltage control signal, wherein, the clock control signal is used to assist re-execution of instructions or local replacement of data by regulating the clock frequency and phase, the voltage control signal is used to assist re-execution of instructions or local replacement of data by regulating the operating voltage of the system, and the clock control signal and voltage control signal are used in combination, so as to increase the frequency or decrease the voltage when there is no time sequence error in the system or decrease the frequency and increase the voltage when an error signal occurs in the system, and thereby attain a purpose of recovering the system from timing errors while keeping the system operating normally with low power consumption.

When the local error recovery mode is selected, the voltage and frequency control module 3 will send a clock gate control signal to the local error recovery module 5, to suspend the clock signal of the relevant circuits by a cycle; the local error recovery module 5 sends a local error recovery control signal to the on-chip monitoring circuit 1, to accomplish local replacement of the error signal with a correct signal. When the global error recovery mode is selected, the global error recovery module 6 will send a pipeline refresh signal to relevant circuit modules of the pipeline, and assist other control modules to accomplish global error recovery.

Figure 5:
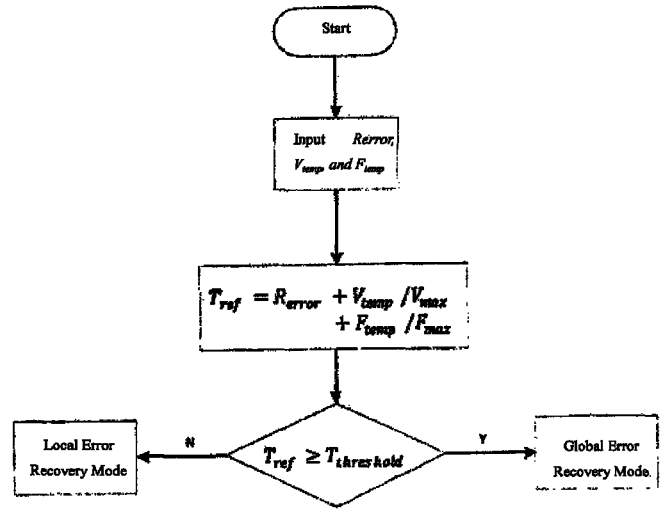
FIG. 5 is a flow chart of establishing the threshold comparison and selection mechanism in the present invention.
Figure 6:
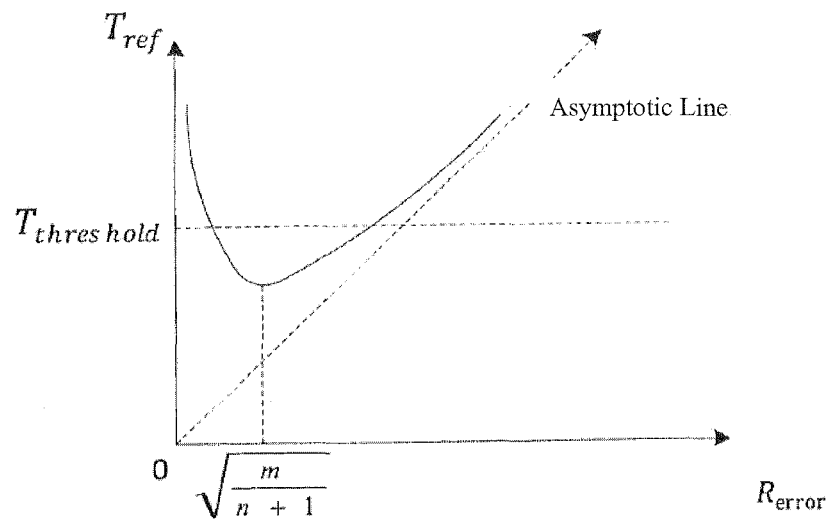
FIG. 6 is a functional curve chart of the comparative parameter $T_{ref}$ (note: in the chart, the horizontal coordinate is error ratio, and the longitudinal coordinate is comparative parameter)
Figure 7:
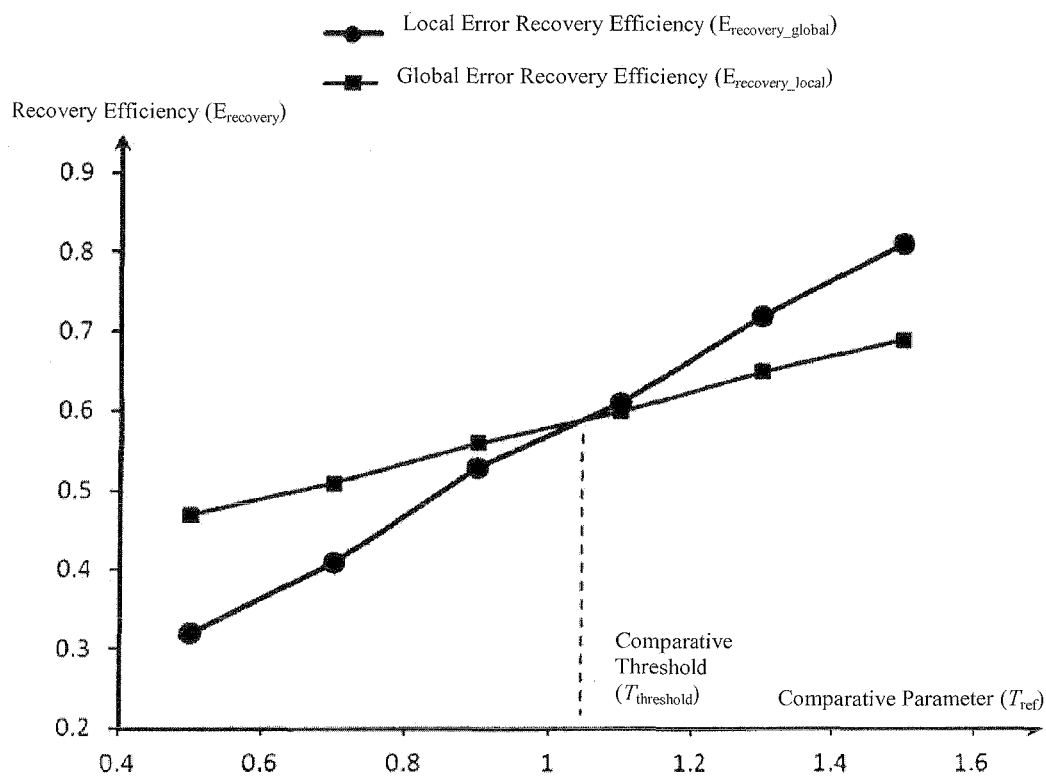
FIG. 7 is a functional curve chart of recovery efficiency $E_{recovery}$ (including local error recovery efficiency $E_{recovery\_local}$ and global error recovery efficiency $E_{recovery\_global}$) vs. comparative parameter $T_{ref}$ (note: in the chart, the horizontal coordinate is comparative parameter, and the longitudinal coordinate is recovery efficiency).

As shown in FIG. 5, the threshold comparison and selection mechanism in the error recovery control module 4 is established through the following procedures: First, find out a comparative threshold $T_{threshold}$. In the circuit design stage, suppose the step size of dynamic voltage control for the circuit is $V_{step}$, the step size of dynamic frequency control for the circuit is $F_{step}$, the minimum operating voltage in dynamic voltage control of the circuit is the maximum operating voltage is $V_{max}$, the minimum operating frequency in dynamic frequency control of the circuit is $F_{min}$, and the maximum operating frequency is $F_{max}$. The operating points of dynamic circuit control are $V_{min}+n^*V_{step}$ or $F_{min}+k^*F_{step}$ respectively, where, $0 \leq n \leq (V_{max}-V_{min})/V_{step}$, $0 \leq k \leq (F_{max}-F_{min})/F_{step}$, and both n and k are integers. The comparative threshold $T_{threshold}$ comprises error ratio $R_{error}$, operating voltage ratio $V_{temp}/V_{max}$, and operating frequency ratio $F_{temp}/F_{max}$, wherein, the current operating voltage of the circuit is $V_{temp}=V_{min}+i^*V_{step}$, the current operating frequency of the circuit is $F_{temp}=F_{min}+j^*F_{step}$, where, $0 \leq i \leq (V_{max}-V_{min})/V_{step}$, $0 \leq j \leq (F_{max}-F_{min})/F_{step}$, and both i and j are integers. Calculate the values of the comparative parameter $T_{ref}=R_{error}+V_{temp}/V_{max}+F_{temp}/F_{max}$ at each operating point of dynamic circuit control. Since the error ratio $R_{error}$ is inversely proportional to the operating voltage ratio $V_{temp}/V_{max}$ and proportional to the operating frequency ratio $F_{temp}/F_{max}$, the formula $T_{ref}=R_{error}+V_{temp}/V_{max}+F_{temp}/F_{max}$ can be rewritten as $T_{ref}=R_{error}+m/R_{error}+n^*R_{error}$, where, both m and n are constants greater than 0; thus, the curve of function $T_{ref}$ vs. error ratio $R_{error}$ has the lowest point in the first quartile, as shown in FIG. 6. In the circuit design stage, when the circuit operates at different operating points, recover the working state of the circuit in global error recovery mode and local error recovery mode respectively at each operating point, and at the same time measure the recovery efficiency of either recovery mode respectively, wherein, suppose the local error recovery efficiency is $E_{recovery\_local}$, and the global error recovery efficiency is $E_{recovery\_global}$. Then, a relational curve between recovery efficiency $E_{recovery}$ (local error recovery efficiency $E_{recovery\_local}$ and global error recovery efficiency $E_{recovery\_global}$ respectively) and comparative parameter $T_{ref}$ is obtained, and it is indicated that the recovery efficiency $E_{recovery}$ is in a linear relationship with the comparative parameter $T_{ref}$, as shown in FIG. 7. When the comparative parameter $T_{ref}$ exceeds a specific value, the power consumption reduction benefit in global error recovery mode is higher; when the comparative parameter $T_{ref}$ is smaller than that value, the power consumption reduction benefit in local error recovery mode is higher; and that value is the comparative threshold $T_{threshold}$.

After the comparative threshold $T_{threshold}$ is selected, set the comparative threshold $T_{threshold}$ into the error recovery control module 4 in a programmable manner as a standard of comparison for error recovery mode selection. For a given circuit, the comparative threshold $T_{threshold}$ is fixed, and does not have to be changed in the process.

Then, select an error recovery mode. Since the error signal statistics module 2 and voltage and frequency control module 3 update the error ratio $R_{error}$, operating voltage ratio $V_{temp}/V_{max}$, and operating frequency ratio $F_{temp}/F_{max}$ transmitted to the error recovery control module 4 in each clock cycle, the error recovery control module 4 calculates the current value of the comparative parameter $T_{ref}$ and compares the current comparative parameter $T_{ref}$ of the circuit with the preset comparative threshold $T_{threshold}$ in each clock cycle. If the comparative parameter $T_{ref}$ is greater than the comparative threshold $T_{threshold}$, the error recovery control module 4 will send a global error recovery mode selection signal to the global error recovery mode module 6, and thus select global error recovery mode; if the comparative parameter $T_{ref}$ is smaller than the comparative threshold $T_{threshold}$, the error recovery control module 4 will send a local error recovery mode selection signal to the local error recovery module 5, and thus select local error recovery mode. The error recovery control module 4 selects an corresponding error recovery mode according to the comparative threshold $T_{threshold}$, and generates voltage control signal and frequency control signal according to the selected error recovery mode; the voltage and frequency control module 3 regulates the operating voltage of the system to the specified value, so as to attain an optimal power consumption effect.

The present invention selects an appropriate error recovery mode by comparing with a preset comparative threshold according to the circuit error ratio and system state, so that a maximum power consumption reduction benefit can be attained.

Though the present invention has been described and presented above with reference to some preferred embodiments, those embodiments shall not be construed as constituting any limitation to the present invention. Various modifications can be made to the embodiments in the form and details without departing from the spirit and scope of the present invention as confined in the attached claims.

The invention claimed is:

1. An error recovery circuit based on an on-chip monitoring circuit, said error recovery circuit including an error signal statistics module, a voltage and frequency control module, an error recovery control module, a local error recovery module, and a global error recovery module, wherein:

the on-chip monitoring circuit is integrated at a terminal of each first N−1 pipeline stages of a Central Processing Unit (CPU) core in N-stage pipeline architecture, and monitors a time sequence information of each clock cycle in an operating circuit, where N− is the number of pipeline stages and is a positive integer greater than or equal to 3 but smaller than 20; the on-chip monitoring circuit feeds any error signals detected by it into the error signal statistics module;

the error signal statistics module performs statistics on a percentage of the number of error signals in a specific number of clock cycles to a total number of clock cycles, and such percentage is considered as an error ratio $R_{error}$;

the voltage and frequency control module controls an increase and decrease of the operating voltage and frequency of the system as well as the control accuracy, and the voltage and frequency control module and error signal statistics module feed system state and error ratio $R_{error}$ into the error recovery control module respectively; the voltage and frequency control module regulates operating voltage and frequency of the system according to control signals from the error recovery control module;

the error recovery control module has a preset comparative threshold $T_{threshold}$ in it, and determines whether to input a local error recovery mode selection signal into the local error recovery module or to input a global error recovery mode selection signal into the global error recovery module, so as to select local error recovery mode or global error recovery mode dynamically according to the result generated in a threshold comparison and selection mechanism, and sends a voltage and frequency control signal to the voltage and frequency control module to instruct system state regulating, so as to realize dynamic switchover between two different error recovery modes.

2. The error recovery circuit according to claim 1, wherein, the on-chip monitoring circuit comprises two input ports and two output ports, which are a data input terminal, a local error recovery control signal input terminal, a data output terminal, and an error signal output terminal, respectively; the data input terminal is connected to a data signal output terminal of a previous stage in the pipeline where the on-chip monitoring circuit is inserted; the local error recovery control signal input terminal is connected to a local error recovery control signal output terminal of the local error recovery module; the data output terminal is connected to a data signal input terminal of a post stage in the pipeline where the on-chip monitoring circuit is inserted; the error signal output terminal is connected to an input terminal of an error signal transmission integration circuit; the error signal transmission integration circuit consists of N−1 registers and N−2 two-input OR gates connected alternatively, and is configured to transmit the error signals generated in all pipeline stages to follow-up stages along with instructions and finally integrate the errors signals into one error signal; an input terminal of the two-input OR gate is connected to the output terminal of a register, and another input terminal of the two-input OR gate is connected to the error signal output terminal of the on-chip monitoring circuit.

3. The error recovery circuit according to claim 1, wherein, the error signal statistics module comprises two counters, which count the number of CPU operating cycles and the number of error signals respectively.

4. The error recovery circuit according to claim 1, wherein, the error recovery control module has three input terminals and three output terminals, which are an error ratio input terminal, a system state input terminal, a comparative threshold input terminal, and a voltage frequency control signal output terminal, a local error recovery mode selection signal output terminal, and a global error recovery mode selection signal output terminal respectively; wherein, the error ratio input terminal, the system state input terminal, and the comparative threshold input terminal are connected to the input terminals of a 8-bit register respectively, specifically, the error ratio input terminal is connected to a first register, the system state input terminal is connected to a second register, and the comparative threshold input terminal is connected to a third register;

the output terminal of the first register and the output terminal of the second register are connected to the data input terminals of an 8-bit adder respectively, and a carry-save input terminal of the 8-bit adder is set to 0; the sum output terminal of the 8-bit adder is connected to one data input terminal of a comparator, and the output terminal of the third register is connected to another data input terminal of the comparator; three input terminals of the comparator are set to 0; one output terminal outputting a greater output and a second terminal of the comparator is connected to an OR gate, and the output of the OR gate are connected to a selection terminal of a multiplexer MUX1; an output terminal of the comparator out putting a smaller output is connected to another multiplexer MUX2; one terminal of the multiplexer MUX1 and of the multiplexer MUX2 are connected to high level, while zero terminals are connected to low level; an output signal of the multiplexer MUX1 is a local error recovery mode selection signal, while an output signal of the multiplexer MUX2 is a global error recovery mode selection signal; in addition, the error ratio input terminal, system state input terminal, local error recovery mode selection signal, and global error recovery mode selection signal are connected to a state machine, and an output of the state machine is a voltage and frequency control signal.

5. The error recovery circuit according to claim 1, wherein, a corresponding voltage and frequency control signal generated by the error recovery control module during error recovery is inputted to the voltage and frequency control module, and the voltage and frequency control signal contains a clock control signal and a voltage control signal, wherein, the clock control signal is used to assist re-execution of instructions or local replacement of data by regulating the clock frequency and phase, the voltage control signal is used to assist re-execution of instructions or local replacement of data by regulating the operating voltage of the system, and a clock control signal and voltage control signal are used in combination, so as to increase the frequency or decrease the voltage when there is no time sequence error in the system or decrease the frequency and increase the voltage when an error signal occurs in the system, and thereby attain a purpose of recovering the system from timing errors while keeping the system operating normally with low power consumption.

6. The error recovery circuit according to claim 1, wherein, the threshold comparison and selection mechanism is to compare a comparative parameter $T_{ref}$ with a comparative threshold $T_{threshold}$, and the comparative parameter $T_{ref}$ is obtained from a formula $T_{ref}=R_{error}+V_{temp}/V_{max}+F_{temp}/F_{max}$, which are error ratio ($R_{error}$), operating voltage ratio ($V_{temp}/V_{max}$), and operating frequency ratio ($F_{temp}/F_{max}$), respectively; wherein, the error ratio is the error ratio of the system within a specific number of clock cycles as calculated by the error signal statistics module, the operating voltage ratio is the ratio of current operating voltage of the circuit to maximum operating voltage of the circuit, and the operating frequency ratio is the ratio of current operating frequency of the circuit to maximum operating frequency of the circuit.

* * * * *